United States Patent [19]

Saito et al.

[11] Patent Number: 5,014,417

[45] Date of Patent: May 14, 1991

[54] APPARATUS FOR ASSEMBLING INK RIBBON FEEDER ROLLER ASSEMBLIES OF INK RIBBON CASSETTES

[75] Inventors: Masayuki Saito, Sayama; Takenobu Fujimoto, Kamifukuoka; Takuya Hagiwara, Kawagoe, all of Japan

[73] Assignee: Dynic Corporation, Kyoto, Japan

[21] Appl. No.: 538,856

[22] Filed: Jun. 15, 1990

[51] Int. Cl.[5] ............................................. B23P 21/00
[52] U.S. Cl. ...................................... 29/783; 29/787;
29/789; 29/797; 29/771
[58] Field of Search ..................... 29/222, 235, 281.5, 29/771, 783, 787, 789, 791, 795, 797, 809, 823; 221/290, 294, 297, 298

[56] References Cited

U.S. PATENT DOCUMENTS

| | | | |
|---|---|---|---|
| 2,966,739 | 1/1961 | Kalbow | 29/771 |
| 3,393,439 | 7/1968 | Shriver | 29/823 |
| 3,605,239 | 9/1971 | Eschholz | 29/717 |

FOREIGN PATENT DOCUMENTS 154783  9/1984  Japan .

Primary Examiner—P. W. Echols
Assistant Examiner—David P. Bryant
Attorney, Agent, or Firm—Dann, Dorfman, Herrell and Skillman

[57] ABSTRACT

An apparatus for automatically and successively assembling ribbon feeder roller assemblies of ink ribbon cassettes, comprises a fixed base, shaft supplying means for supplying a horizontally positioned shaft to a first predetermined position on the fixed base, a pair of roller supplying means for supplying a pair of elastic rollers to be fitted to the shaft to second predetermined positions on the fixed base where axes of the rollers are in parallel with an axis of the shaft and where the rollers are in axial alignment with each other, a first reciprocating member supported on the fixed base and capable of reciprocating in a direction orthogonal to the axis of the shaft, a pair of second reciprocating members supported on the fixed base on each side of the first reciprocating member and capable of reciprocating in a direction orthogonal to the reciprocating direction of the first reciprocating member, and drive control means for controlling and driving the first and second reciprocating members in a predetermined synchronous manner.

6 Claims, 6 Drawing Sheets

APPARATUS FOR ASSEMBLING INK RIBBON FEEDER ROLLER ASSEMBLIES OF INK RIBBON CASSETTES

BACKGROUND OF THE INVENTION

1. Field of the Invention

The present invention relates to an apparatus for automatically and successively assembling ink ribbon feeder roller assemblies of ink ribbon cassettes that are widely printing units of word processors, typewriters and printers.

2. Description of the Prior Art

Word processors and typewriters incorporate printing units, and personal computers connect printers thereto. The printing units and printers generally involve ink ribbon cassettes which accommodate folded endless ink ribbons.

An example of such ink ribbon cassettes is shown in FIG. 6. A cassette case 80 has a ribbon space 81. A primary roller assembly 82 and a follower roller assembly 83 are disposed to face each other at one side of the ribbon space 81. An endless ink ribbon 100 is regularly folded and received in the ribbon space 81. The roller assemblies 82 and 83 hold the ink ribbon 100 between them and feed the same in a direction indicated with an arrow mark.

In FIG. 7(a), the primary roller assembly 82 comprises a shaft 84, flanges 85a and 85b formed at each end of the shaft 84, a central large diameter portion 86, and a pair of circumferential grooves 87a and 87b formed between the flanges 85a and 85b and the central large diameter portion 86. Ring-shaped rollers 90a (FIG. 6) and 90b are fitted to the grooves 87a and 87b, respectively. The rollers 90a and 90b are made of elastic material such as porous synthetic resin and foam rubber. A solid operation shaft 88 extends from the flange 85a at one end of the primary shaft 84. When assembled, the operation shaft 88 protrudes from the cassette case 80. By slightly turning the operation shaft 88 in a clockwise direction in FIG. 6, slack of the ink ribbon 100 can be removed. Opposite to the operation shaft. 88, the primary shaft 84 has a hollow shaft 89 into which a driving shaft (not shown) of a printer carriage is inserted. According to rotations of the driving shaft, the primary shaft 84 is rotated in a clockwise direction in FIG. 6.

In FIG. 7(b), the follower roller assembly 83 has a similar structure as that of the primary roller assembly 82. The follower roller assembly 83 is substantially axially symmetrical with respect to its central large diameter portion 93. A follower shaft 91 has flanges 92a and 92b at each end thereof. Rotary shafts 95a and 95b, each which has a small diameter extend outwardly from the flanges 92a and 92b, respectively. As shown in FIG. 6, a plate spring 96 pushes support arms 97 toward the primary roller assembly 82. The support arms 97 have through holes into which the rotary shafts 95a and 95b are inserted, respectively. In this way, the follower roller assembly 83 is supported by the support arms 97. Similar to the primary roller assembly 82, the follower roller assembly 83 has circumferential grooves 94a and 94b to which rollers 90c (FIG. 6) and 90d are fitted respectively. The rollers 90c and 90d are pressed against the rollers 90a and 90b of the primary roller assembly 82 to hold the ink ribbon 100 between them.

When the primary shaft 84 is driven, the follower shaft 91 is rotated in a counterclockwise direction in FIG. 6 to feed the ink ribbon 100 in the direction indicated with the arrow mark.

In FIGS. 7(a) and 7(b), the grooves 87a and 87b of the L primary shaft 84 and the grooves 94a and 94b of the follower shaft 91 have the same diameter, and the rollers 90a, 90b, 90c and 90d fitted to the grooves are identical to each other. If required, the primary shaft 84 and follower shaft 91 may have grooves of different diameters, and in this case, rollers fitted to the grooves may have different diameters.

Conventionally, the roller assemblies mentioned above are manually assembled. With the help of elasticity of the rollers, the rollers are pushed beyond the flanges 85a, 85b, 92a and 92b and fitted to the grooves 87a, 87b, 94a and 94b. This manual work takes time and manpower, and therefore, it is desirable to provide an apparatus that can automatically and successively assemble the roller assemblies.

SUMMARY OF THE INVENTION

An object of the present invention is to provide an apparatus for automatically and successively assembling ribbon feeder roller assemblies of ink ribbon cassettes.

According to an aspect of the present invention, the apparatus comprises a fixed base, shaft supplying means for supplying a horizontally positioned shaft to a first predetermined position on the fixed base, a pair of roller supplying means for supplying a pair of elastic rollers to be fitted to the shaft to second predetermined positions on the fixed base where axes of the rollers are in parallel with an axis of the shaft and where the rollers are symmetrical to each other with respect to a supply line of the shaft, a first reciprocating member supported on the fixed base and capable of reciprocating in a direction orthogonal to the axis of the shaft, a pair of second reciprocating members supported on the fixed base on each side of the first reciprocating member and capable of reciprocating in a direction orthogonal to the reciprocating direction of the first reciprocating member, and drive control means for controlling and driving the first and second reciprocating members with predetermined synchronous relations.

The first reciprocating member involves a shaft receiver and a pair of roller receivers. The shaft receiver has clamping means that receives a shaft supplied to the first predetermined position by the shaft supplying means. The roller receivers receive a pair of elastic rollers supplied to the second predetermined positions by the roller supplying means. Each of the second reciprocating members comprises a piston rod, and a ring pusher that is slidable relative to the piston rod.

The first reciprocating member takes first through third stop positions in the reciprocating direction. At the first stop position, the shaft receiver of the first reciprocating member is located under the shaft supplying means to receive a shaft supplied by the shaft supplying means. Also at the first stop position of the first reciprocating member, axes of a pair of elastic rollers received in the roller receivers are aligned with axes of the piston rods of the second reciprocating members. At the second stop position, an axis of the shaft received in the shaft receiver is aligned with the axes of the piston rods of the second reciprocating members. At the third stop position that is an intermediate position between the first and second stop positions, the roller receivers are located under the roller supplying means, respectively, to receive elastic rollers from the roller supplying means.

When the first reciprocating member is at the first stop position, the second reciprocating members are moved toward each other, and front ends of the piston rods enter center holes of the rollers received in the roller receivers. At the same time, the shaft receiver receives a shaft from the shaft supplying means. Thereafter, the second reciprocating members with their piston rods engaging with the rollers are moved away from each other, and the first reciprocating member is moved backward to the second stop position. At the second stop position, the second reciprocating members are moved toward each other, and the shaft receiver holding the shaft is held between the piston rods. Under this state, the first reciprocating member is moved to the third stop position. Due to this movement, the clamping means of the shaft receiver is released, and therefore, the shaft is released from the shaft receiver. At the third stop position, the ring pushers of the second reciprocating members are moved toward each other, so that the rollers held at the front ends of the piston rods are transferred from the piston rods to the shaft. Thereafter, the ring pushers are moved away from each other, and the second reciprocating members are moved away from each other, thereby releasing the shaft fitted with the rollers from the piston rods. The first reciprocating member is then moved to the first stop position.

The above motions of the first and second reciprocating members are controlled by the drive control means, thereby automatically and successively assembling roller assemblies.

These and other objects, features and advantages of the present invention will be more apparent from the following detailed description of preferred embodiments in conjunction with the accompanying drawings.

DETAILED DESCRIPTION OF THE EMBODIMENTS

An apparatus for assembling roller assemblies according to a preferred embodiment of the present invention will be explained with reference to accompanying drawings.

Figure 1:
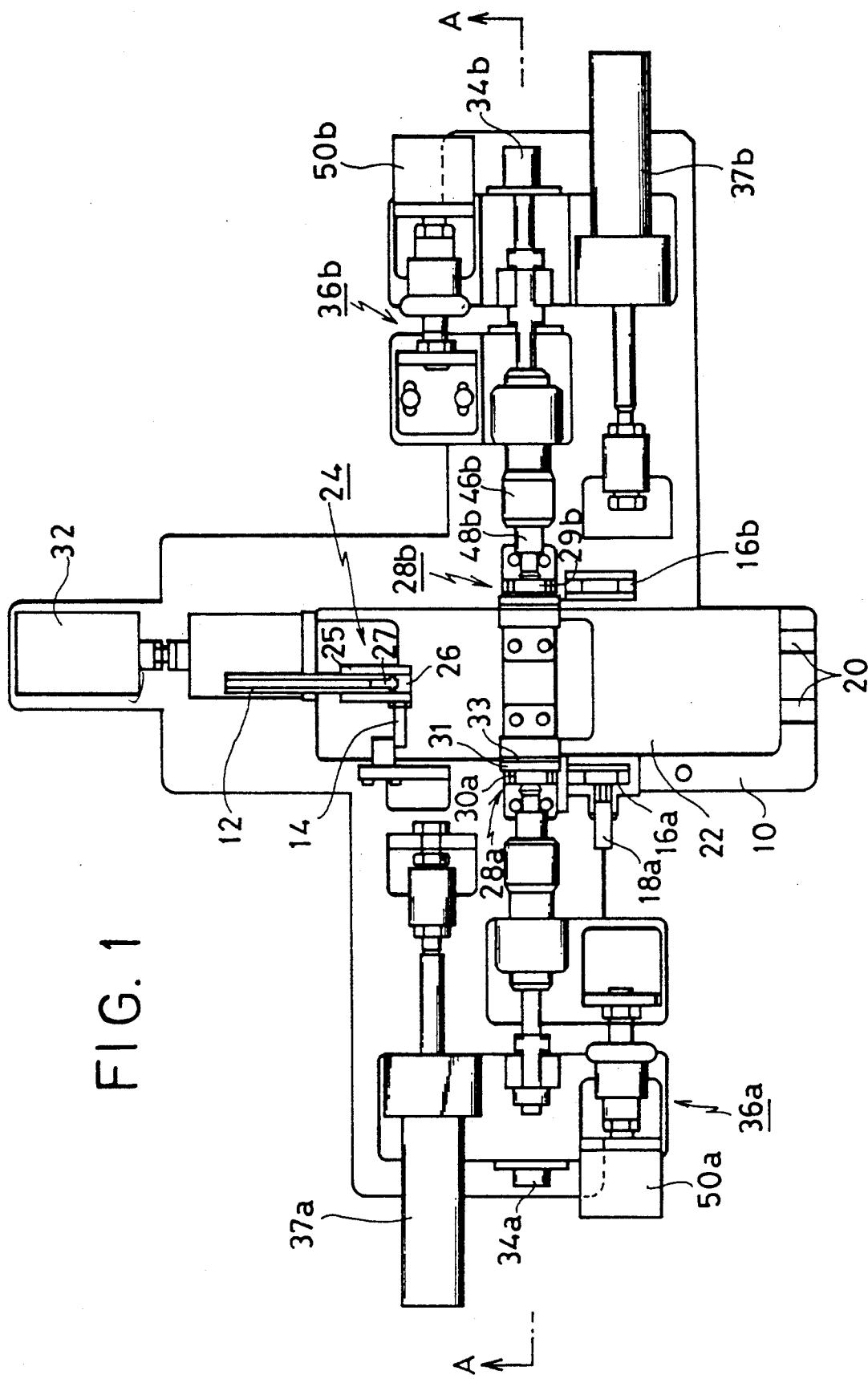
FIG. 1 is a front view showing an apparatus for assembling roller assemblies according to an embodiment of the present invention.
Figure 2:
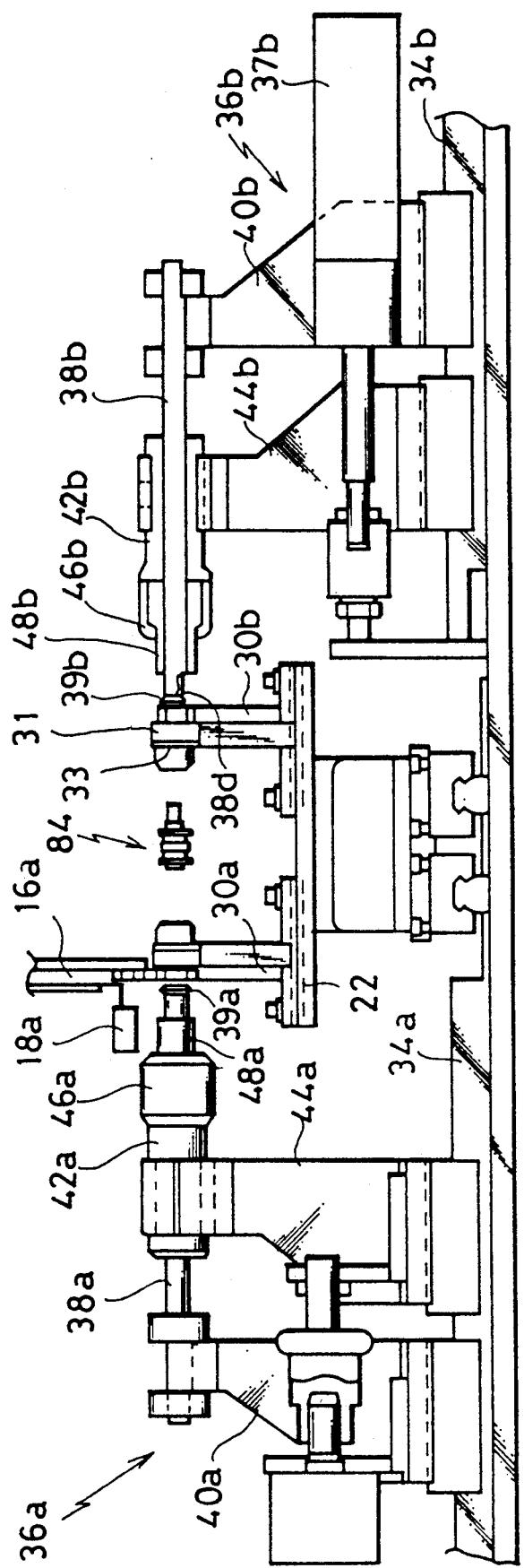
FIG. 2 is a sectional view taken along a line A-A of FIG. 1.
Figure 3:
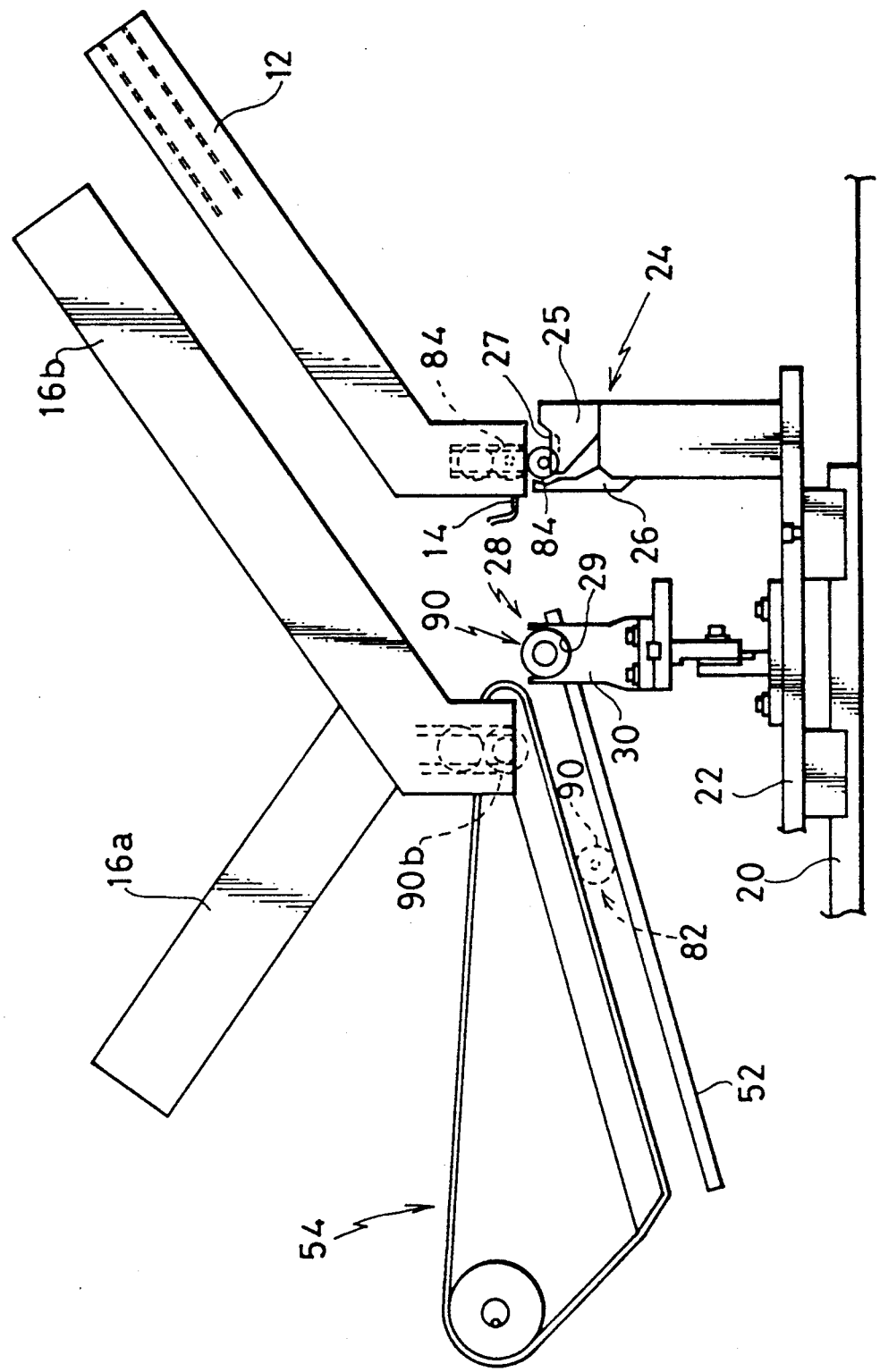
FIG. 3 is a right side view showing the apparatus of FIG. 1.

In FIGS. 1 to 3, the apparatus comprises a shaft supplying portion for successively supplying shafts to a predetermined position, a pair of roller supplying portions for successively supplying rollers to predetermined positions, a jig portion for assembling a roller assembly from a shaft supplied by the shaft supplying portion and a pair of rollers supplied by the roller supplying portion, and a conveying portion for conveying a completed roller assembly to the outside of the apparatus.

Although the apparatus of the embodiment is arranged to assemble the primary roller assembly 82, the apparatus is applicable for assembling the follower roller assembly 83 with no substantial changes to the apparatus.

The shaft supplying portion comprises a chute 12. The chute 12 receives primary shafts 84 supplied by a feeder (not shown), and sends out the lowest one of the primary chute 12 is fixed to a fixed base 10. The feeder for feeding the primary shafts 84 to the top of the chute 12 may be optional. For example, the feeder may be a known parts feeder employing a circulating slope that is slightly vibrated to successively bring the primary shafts upward and feed them.

The primary shafts 84 are horizontally positioned, and axes thereof are oriented orthogonally to a shaft supplying line. Under these conditions, the primary shafts are successively supplied to the predetermined position through the chute 12. Each primary shaft 84 is axially asymmetrical on the central large diameter portion 86 thereof. It is preferable, therefore, to supply the primary shafts 84 with their operation shafts 88 being on one side. In this embodiment, the operation shafts are oriented rightward in FIG. 1.

A pin cylinder 14 is disposed at a lower end of the chute 12. The pin cylinder 14 is inserted into the hollow shaft 89 of the primary shaft 84 to stop the primary shaft 84 from dropping. When a sensor (not shown) provides a signal, the pin cylinder 14 is removed from the hollow shaft 89 to drop the lowest one of the shafts 84 stored in the chute 12.

A pair of the roller supplying portions are fixed to the fixed base 10. Similar to the shaft supplying portion, each of the roller supplying portions comprises a parts feeder (not shown) and a chute (16a, 16b) connected to the parts feeder to receive rollers from the parts feeder and supplying them to the predetermined position of the apparatus. A pair of the roller chutes 16a and 16b are disposed in parallel with the shaft chute 12, and the lower ends of the roller chutes are symmetrically located with respect to the shaft supplying line. The roller chutes 16a and 16b supply a pair of rollers 90a and 90b to the two predetermined positions of the apparatus, respectively. At this time, the rollers 90a and 90b are supplied with their axes being oriented horizontally.

A pin cylinder 18 (only one for the left chute is shown in FIGS. 1 and 2) is disposed at a lower end of each roller chute (16a, 16b). The pin cylinder 18 acts as a stopper and is inserted into an axial hole of a roller to stop the roller from dropping. When a sensor (not shown) provides a signal, the pin cylinder 18 is removed from the roller to drop the roller from the chute 16.

The jig portion comprises a longitudinally moving carriage 22. The carriage 22 is reciprocated on a pair of guide rails 20 that extend in parallel with the shaft and roller supplying lines on the fixed base 10.

A shaft receiver 24 is arranged at one end of the carriage 22 to receive at the predetermined position the shaft 84 supplied from the shaft chute 12. A pair of roller receivers 28a and 28b are disposed at the other end of the carriage 22 to receive at the predetermined positions the rollers 90a and 90b supplied from the roller chutes 16a and 16b. The shaft receiver 24 roller receivers 28a and 28b maintain their relative positions and are moved relative to the fixed base 10 and members fixed to the fixed base 10.

In FIG. 3, the shaft receiver 24 comprises a support piece 25 fixed to the carriage 22 to receive the shaft 84 dropped from the shaft chute 12, and a clamp 26 that is swingable relative to the support piece 25. The clamp 26 is usually pushed in a clockwise direction in FIG. 3 by a spring (not shown) to form, together with the fixed support piece 25, a U-shaped recess 27 for receiving the shaft 84. When a pressure greater than a predetermined value is applied in a shaft supplying direction (leftward in FIG. 3) to the clamp 26, the clamp 26 is swung to release the shaft 84 from the recess 27.

Each of the roller receivers 28 comprises an upright piece 30 having a U-shaped recess 29 for receiving the roller 90 dropped from the roller chute 16.

Driving means such as a pneumatic cylinder 32 is connected to an end of the carriage 22 to reciprocate the carriage 22 along the guide rails 20.

The jig portion comprises a pair of laterally moving carriages 36a and 36b disposed symmetrically with respect to the shaft supplying line. The carriages 36a and 36b are reciprocated on guide rails 34a and 34b, respectively. The guide rails 34a and 34b extend on the fixed base 10 orthogonally to the guide rails 20 that support the longitudinally moving carriage 22. Driving means 37a and 37b such as pneumatic cylinders synchronously and symmetrically reciprocate the carriages 36a and 36b. The longitudinally moving carriage 22 and laterally moving carriages 36a and 36b are controlled by control means (not shown) connected to the driving means of the carriages and reciprocated at predetermined synchronous relations. The carriages 36a and 36b have the same arrangement, so that the following explanation will be done for the carriage 36b.

In FIG. 2, the carriage 36b comprises a piston rod support leg 40b for supporting a rear end of a piston rod 38b, and a cylinder support leg 44b for supporting a cylinder 42b in which the piston rod 38b can slide. An outer diameter of the piston rod 38b is nearly equal to a diameter of the roller 90, and a front edge of the piston rod 38b is slightly widened. The piston rod 38b has a bore 38d whose diameter is slightly larger than an outer diameter of the hollow shaft 89 and an outer diameter of the operation shaft 88 of the primary shaft 84.

A roller inserting ring 48b is removably fitted to a front end of the cylinder 42b by a nut 46b. The piston rod inserting ring 48b. A distance between the roller inserting ring 48b and a widened front end 39b of the piston rod 38b is adjusted to be slightly longer than the thickness of the roller 90.

The two support legs 40b and 44b move together with the carriage 36b that is reciprocated by the driving means 37b. A separate pneumatic cylinder 50b (FIG. 1) reciprocates the cylinder support leg 44b toward and away from the piston rod support leg 40b. The roller 90 is positioned between the roller inserting ring 48b and the widened end 39b of the piston rod 38b, and pushed forward beyond the widened end 39b. The laterally moving carriages L 36a and 36b have the identical arrangement and are simultaneously synchronously moved.

The conveying portion comprises an inclined plate 52 on which a completed primary roller assembly rolls due to its own weight, and an endless conveyor belt 54 circulated at a required speed. A gap between a lower passage of the conveyor belt 54 and the inclined plate 52 is slightly smaller than an outer diameter of the roller 90. The belt 54 and plate 52 extend in parallel with each other. As shown in FIG. 3, therefore, the rollers 90a and 90b assembled to the shaft of the primary roller assembly 82 are slightly compressed while they are rolling along the inclined plate 52.

A container (not shown) is arranged under the inclined plate 52 for collecting the completed primary roller assembly 82.

When the longitudinally moving carriage 22 is located as shown in FIGS. 1 through 3, the centers of the rollers 90a and 90b received in the recesses 29 of the respective roller receivers 28 are correctly aligning with the axial centers of the piston rods 38a and 38b. At this location, the rollers 90a and 90b are fitted to front ends of the piston rods 38a and 38b.

When the longitudinally moving carriage 22 is stopped at the above location, the laterally moving carriages 36a and 36b are horizontally moved toward each other. The widened ends 39a and 39b of the piston rods 38a and 38b expand the center holes of the rollers 90a and 90b to enter therein. The piston rods 38a and 38b are moved until the roller inserting rings 48a and 48b hit the upright pieces 30a and 30b. At this time, the pneumatic cylinders 50a and 50b for independently driving the cylinder support legs 44a and 44b of the laterally moving carriages 36a and 36b are not operated, so that predetermined gaps are maintained between the roller inserting rings 48a and 48b and the piston rod ends 39a and 39b to hold the rollers 90a and 90b in the gaps, respectively. Thereafter, the carriages 36a and 36b are moved away from each other.

When the longitudinally moving carriage 22 is positioned as mentioned above, the shaft receiver 24 is located under the shaft chute 12 as shown in FIG. 3. This state is detected by the sensor, which provides a signal according to which the pin cylinder 14 is removed from the hollow shaft 89 of the lowest one of the primary shafts 84 stored in the chute 12. The lowest primary shaft 84 is dropped, therefore, from the shaft chute 12 and received in the U-shaped recess 27 between the support piece 25 and the clamp 26. Thereafter, the pin cylinder 14 enters the shaft chute 12 to stop the next primary shaft 84.

The piston rods 38a and 38b engaging with the rollers 90a and 90b are moved, together with the laterally moving carriages 36a and 36b, away from each other. The longitudinally moving carriage 22 is moved backward on the guide rails 20 to a position shown in FIG. 4. At this position, the axial center of the primary shaft 84 received in the shaft receiver 24 is correctly aligned with the axial centers of the piston rods 38a and 38b on the carriages 36a and 36b.

After the carriage 22 is stopped at the above-mentioned position, the carriages 36a and 36b are horizontally moved toward each other, and the front ends of the piston rods 38a and 38b are pressed against the flanges 85a and 85b of the primary shaft 84. Under this state, the operation shaft 88 and hollow shaft 89 protruding from the flanges 85a and 85b of the primary shaft 84 are received in the bores 38c and 38d of the piston rods 38a and 38b, respectively. Namely, the primary shaft 84 received in the shaft receiver 24 is held by the piston rods 38a and 38b from each side.

Figure 4:
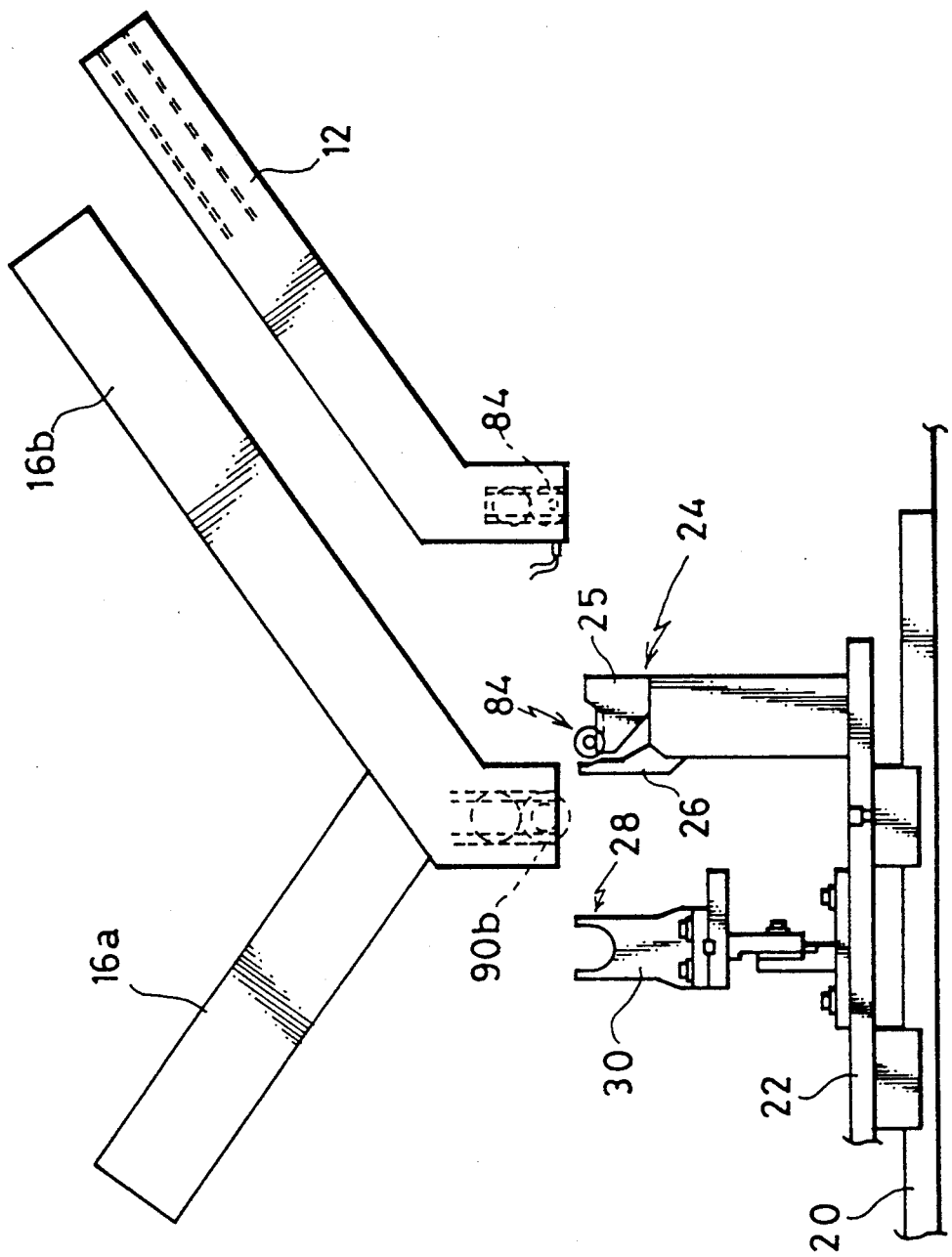
FIGS. 4 and 5 are right side views similar to FIG. 3 but with different positions of a longitudinally moving carriage.
Figure 5:
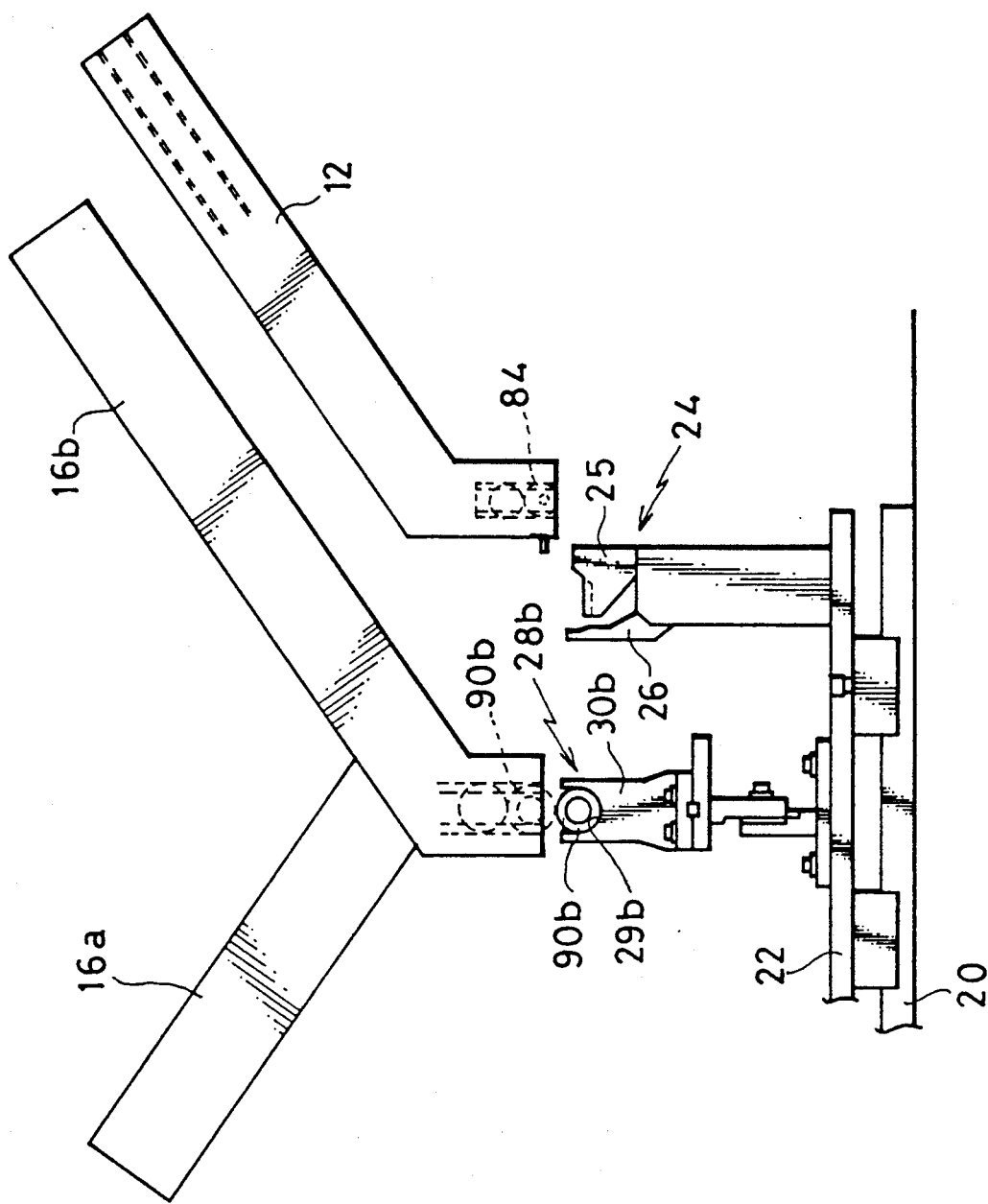
Figure 6:
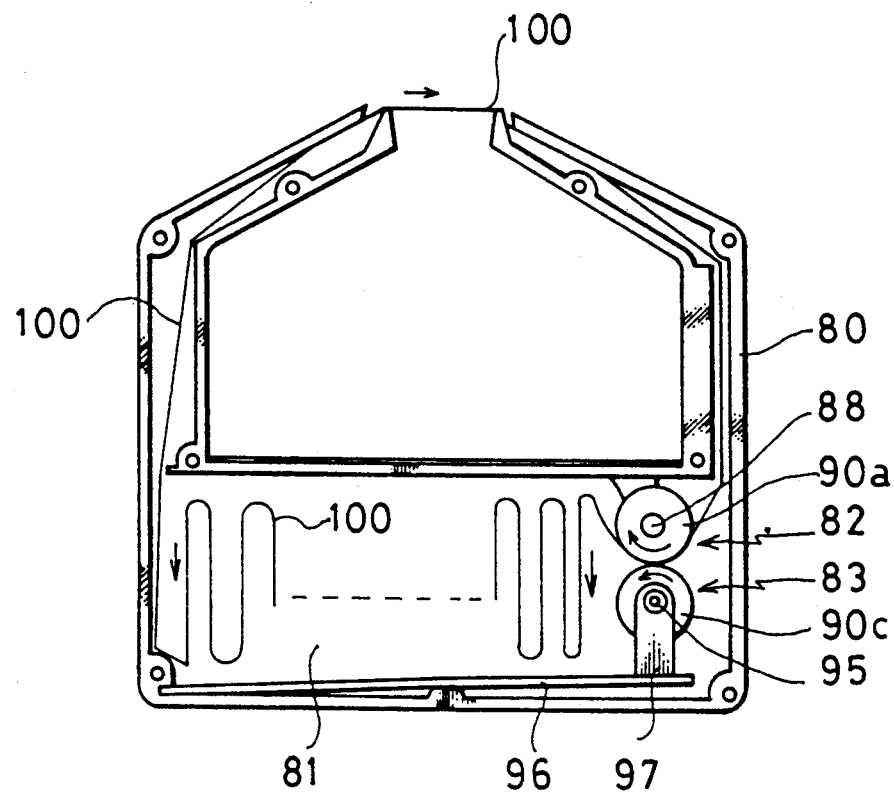
FIG. 6 is a plan view showing the inside of an ink ribbon cassette employing a roller assembly assembled by the apparatus of the present invention.
Figures 7A, 7B:
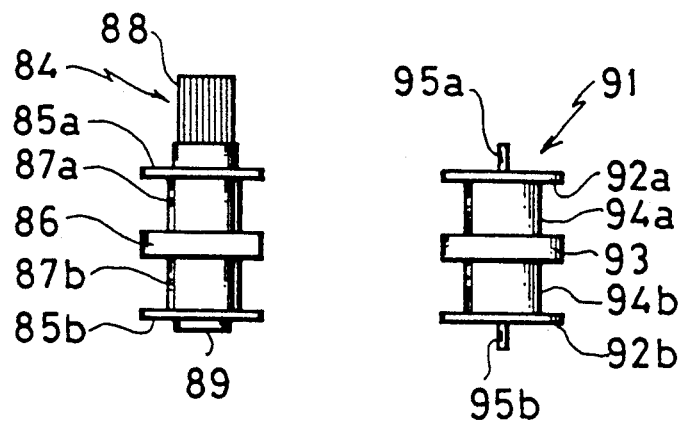
FIG. 7(a) is a front view showing a shaft of a primary roller assembly shown in FIG. 6.
FIG. 7(b) is a front view showing a shaft of a follower roller assembly shown in FIG. 6.

While the carriages 36a and 36b are at the proximal positions to hold the primary shaft 84 between the piston rods 38a and 38b, the longitudinally moving carriage 22 is moved on the guide rails 20 from the position of FIG. 4 to a position of FIG. 5. At this time, the primary shaft 84 is stably held between the piston rods 38a and 38b, so that the clamp 26 of the shaft receiver 24 is swung in a counterclockwise direction in FIG. 3 against a spring force. Then, the primary shaft 84 is removed from the shaft receiver 24 and held only by the piston rods 36a and 36b.

While the carriage 22 is being at the position of FIG. 5 and the carriages 36a and 36b at the proximal positions, the pneumatic cylinders 50a and 50b are operated to move only the cylinder support legs 44a and 44b toward each other on the carriages 36a and 36b. Accordingly, the roller inserting rings 48a and 48b fixed to the cylinders 42a and 42b are moved toward each other beyond the front ends of the piston rods 38a and 38b. As a result, the rollers 90a and 90b fitted between the roller inserting rings 48a and 48b and the piston rod ends 39a and 39b are pushed out of the piston rods 38a and 38b. The rollers 90a and 90b climb over the flanges 85a and 85b of the primary shaft 84 held between the piston rods 38a and 38b, and enter the grooves 87a and 87b.

Such movements of the cylinder support legs 44a and 44b are preferable to be done twice. The reason of this is because, according to tests carried out by the inventor, the rollers 90a and 90b are turned over by the roller inserting rings 48a and 48b and pushed beyond the shaft flanges 85a and 85b. If the forward motions of the roller inserting rings 48a and 48b are carried out only once, parts of the rollers 90a and 90b may remain on the flanges 85a and 85b and not be completely received in the grooves 87a and 87b. By repeating the forward movements of the roller inserting rings 48a and 48b, the rollers 90a and 90b are completely received in the grooves 87a and 87b.

After the rollers 90a and 90b are fitted to the grooves 87a and 87b of the primary shaft 84 by the repetitive motions of the cylinders 42a and 42b, the carriages 36a and 36b are moved away from each other, and the roller inserting rings 48a and 48b and piston rods 38a and 38b are removed from the primary shaft 84. The completed primary roller assembly 82 is left at the top of the inclined plate 52 of the conveying portion as shown in FIG. 3. Due to its own weight, the roller assembly 82 rolls between the inclined plate 52 and the conveyor belt 4, which provide pressure to the roller assembly 82. Due to the pressure, the rollers 90a and 90b of the primary roller assembly 82 are leveled and completely received in the grooves 87a and 87b. The completed primary roller assembly 82 drops from a lower end of the inclined plate 52 into the container.

When the longitudinally moving carriage 22 is at the position of FIG. 5, the roller receivers 28a and 28b are located under the roller chutes 16a and 16b, respectively. These state are detected by the sensors, which provide signals to operate the pin cylinders 18a and 18b disposed at the lower ends of the chutes 16a and 16b. Accordingly, the pin cylinders 18a and 18b are removed from the center holes of the lowest ones of the rollers 90a and 90b stored in the chutes 16a and 16b. The lowest rollers 90a and 90b then drop from the chutes into the U-shaped recesses 29a and 29b of the roller receivers 28a and 28b. Thereafter, the pin cylinders 18a and 18b enter the chutes 16a and 16b to stop the next rollers.

After the primary roller assembly 82 is completed and the next rollers 90a and 90b are transferred for the next assembling work, the carriage 22 is moved on the guide rails 20 to the position shown in FIGS. 1 through 3. The next rollers 90a and 90b in the roller receivers 28a and 28b are transferred to the piston rods 38a and 38b, while the next primary shaft 84 to which the next rollers 90a and 90b are fitted is transferred from the shaft chute 12 to the shaft receiver 24.

The above sequence of operations is repeated to automatically and successively assemble the primary roller assemblies 82 which the conventional technique must manually assemble.

Various modifications will become possible for those skilled in the art after receiving the teachings of the present disclosure without departing from the scope thereof.

What is claimed is:

1. An apparatus for automatically and successively assembling ribbon feeder roller assemblies of ink ribbon cassettes, comprising:
    a fixed base;
    shaft supplying means for supplying a horizontally positioned shaft to a first predetermined position on the fixed base;
    a pair of roller supplying means for supplying a pair of elastic rollers to be fitted to the shaft to second predetermined positions on the fixed base where axes of the rollers are in parallel with an axis of the shaft and where the rollers are in axial alignment with each other;
    a first reciprocating member supported on the fixed base and capable of reciprocating in a direction orthogonal to the axis of the shaft, the first reciprocating member comprising a shaft receiver and a pair of roller receivers, the shaft receiver having clamping means that receives a shaft supplied to the first predetermined position by the shaft supplying means, the roller receivers receiving a pair of elastic rollers supplied to the second predetermined positions by the roller supplying means;
    a pair of second reciprocating members supported on the fixed base on each side of the first reciprocating member and capable of reciprocating in a direction orthogonal to the reciprocating direction of the first reciprocating member, each of the second reciprocating members comprising a piston rod and a ring pusher that is slidable relative to the piston rod; and
    drive control means for controlling and driving the first and second reciprocating members in a predetermined synchronous such manner that the first reciprocating member moves between three stop positions in the reciprocating direction wherein, at the first stop position, the shaft receiver of the first reciprocating member is located under the shaft supplying means to receive a shaft supplied by the shaft supplying means and axes of a pair of elastic rollers received in the roller receivers are aligned with axes of the piston rods of the second reciprocating members, at the second stop position, an axis of the shaft received in the shaft receiver is aligned with the axes of the piston rods of the second reciprocating members and, at the third stop position, an intermediate position between the first and second stop positions, the roller receivers are located under the roller supplying means, to receive elastic rollers from the roller supplying means,
    whereby when the first reciprocating member is at the first stop position, the second reciprocating members are moved toward each other and, front ends of the piston rods enter center holes of the rollers received in the roller receivers and, at the same time, the shaft receiver receives a shaft from the shaft supplying means and, thereafter, the second reciprocating members with their piston rods engaging with the rollers are moved away from each other and, first reciprocating member is moved backward to the second stop position, where the second reciprocating members are moved toward each other and the shaft receiver holding the shaft is held between the piston rods and, under this state, the first reciprocating member is moved to the third stop position with releasing of the clamping means of the shaft receiver and of the shaft from the shaft receiver and, at the third stop position, the ring pushers of the second reciprocating members are moved toward each other and the rollers held at the front ends of the piston rods are transferred from the piston rods to the shaft and, thereafter, the ring pushers are moved away from each other and the second reciprocating members are moved away from each other, thereby releasing the shaft fitted with the rollers from the piston rods, and the first reciprocating member is then moved to the first stop position.

2. The apparatus as claimed in claim 1, further comprising:
   means for conveying a completed assembled roller assembly to the outside of the apparatus.

3. The apparatus as claimed in claim 1, wherein the ring pusher is removably attached to the piston rod.

4. The apparatus as claimed in claim 3, wherein a cylinder is provided for sliding the piston rod therein, and the ring pusher is removably fitted to a front end of the cylinder by a nut.

5. The apparatus as claimed in claim 4, in which the drive control means comprises a first pneumatic cylinder for moving the first reciprocating member, second pneumatic cylinders for moving the pair of second reciprocating members, third pneumatic cylinders for slidably moving the ring pushers along the piston rods of the second reciprocating members, and control means for driving the first, second, and third pneumatic cylinders, in a predetermined synchronous manner.

6. The apparatus as claimed in claim 1, wherein a front edge of the piston rod is slightly widened to have a diameter slightly larger than the diameter of the elastic roller.

* * * * *

UNITED STATES PATENT AND TRADEMARK OFFICE
CERTIFICATE OF CORRECTION

PATENT NO. : 5,014,417
DATED : May 14, 1991
INVENTOR(S) : Masayuki Saito, Takenobu Fujimoto and Takuya Hagiwara It is certified that error appears in the above-identified patent and that said Letters Patent is hereby corrected as shown below:

Column 1, line 11, after "widely" insert --employed in--.

Column 2, line 4, delete "L".

Column 4, line 11, after "primary" insert --shafts to the predetermined position of the apparatus. The--;

line 26, delete "1" and insert --2--;

line 65, after "24" insert --and--.

Column 5, line 46, after "rod" insert --38b passes through and extends further from the roller--;

line 58, after "carriages" delete "L".

Column 7, line 42, delete "4" and insert --54--.

Signed and Sealed this

Third Day of August, 1993

Attest:

MICHAEL K. KIRK

Attesting Officer      Acting Commissioner of Patents and Trademarks